US011925203B2

(12) United States Patent
Brvenik

(10) Patent No.: US 11,925,203 B2
(45) Date of Patent: Mar. 12, 2024

(54) AEROSOL GENERATING ARTICLE, A METHOD FOR MANUFACTURING AN AEROSOL GENERATING ARTICLE AND AN AEROSOL GENERATING SYSTEM

(71) Applicant: JT International S.A., Geneva (CH)

(72) Inventor: Lubos Brvenik, Krpelany (SK)

(73) Assignee: JT International S.A. (CH)

( * ) Notice: Subject to any disclaimer, the term of this patent is extended or adjusted under 35 U.S.C. 154(b) by 805 days.

(21) Appl. No.: 17/051,650

(22) PCT Filed: May 15, 2019

(86) PCT No.: PCT/EP2019/062500
§ 371 (c)(1),
(2) Date: Oct. 29, 2020

(87) PCT Pub. No.: WO2019/224075
PCT Pub. Date: Nov. 28, 2019

(65) Prior Publication Data

US 2021/0227877 A1 Jul. 29, 2021

(30) Foreign Application Priority Data

May 21, 2018 (EP) .................................... 18173398
May 21, 2018 (EP) .................................... 18173404
(Continued)

(51) Int. Cl.
*A24D 1/20* (2020.01)
*A24C 5/01* (2020.01)
(Continued)

(52) U.S. Cl.
CPC .................. *A24C 5/01* (2020.01); *A24D 1/02* (2013.01); *A24D 1/20* (2020.01); *A24F 40/465* (2020.01);
(Continued)

(58) Field of Classification Search
None
See application file for complete search history.

(56) References Cited

U.S. PATENT DOCUMENTS 5,134,000 A * 7/1992 Smythe et al. ......... B29C 65/32 428/57
2015/0157052 A1* 6/2015 Ademe et al. ........... A24D 1/22 131/58
(Continued)

FOREIGN PATENT DOCUMENTS

WO 2016184928 A1 11/2016
WO 2017068099 A1 4/2017
(Continued)

OTHER PUBLICATIONS

International Search Report and Written Opinion for Application No. PCT/EP2019/062500, dated Aug. 11, 2019, 11 pages.

*Primary Examiner* — Dionne W. Mayes
(74) *Attorney, Agent, or Firm* — Lerner David LLP

(57) ABSTRACT

An aerosol generating article includes a body of aerosol forming material and a tubular inductively heatable susceptor surrounding the body of aerosol forming material which includes a rolled sheet having a longitudinally extending joint between opposite edges thereof. The aerosol generating article includes a magnetic shielding material, preferably in the form of a magnetic shielding strip, extending along the longitudinally extending joint so that the joint is covered by the magnetic shielding strip and a non-electrically conductive material between the magnetic shielding strip and the joint. Methods for manufacturing the aerosol generating article and an aerosol generating system are also described.

19 Claims, 6 Drawing Sheets

(30) Foreign Application Priority Data

May 21, 2018 (EP) .................................... 18173406
Jun. 8, 2018 (EP) .................................... 18176708

(51) Int. Cl.

| | |
|---|---|
| ***A24D 1/02*** | (2006.01) |
| ***A24F 40/465*** | (2020.01) |
| ***A24F 40/53*** | (2020.01) |
| ***A24F 40/57*** | (2020.01) |
| ***H05B 6/10*** | (2006.01) |
| *A24F 40/20* | (2020.01) |

(52) U.S. Cl.
CPC .............. *A24F 40/53* (2020.01); *A24F 40/57* (2020.01); *H05B 6/108* (2013.01); *A24F 40/20* (2020.01)

(56) References Cited

U.S. PATENT DOCUMENTS

| | | | | |
|---|---|---|---|---|
| 2017/0055581 | A1 | 3/2017 | Wilke et al. | |
| 2018/0289067 | A1* | 10/2018 | Courbat et al. ......... | A24F 40/44 |

FOREIGN PATENT DOCUMENTS

| | | | |
|---|---|---|---|
| WO | 2018002083 | A1 | 1/2018 |
| WO | 2018002084 | A1 | 1/2018 |

* cited by examiner

AEROSOL GENERATING ARTICLE, A METHOD FOR MANUFACTURING AN AEROSOL GENERATING ARTICLE AND AN AEROSOL GENERATING SYSTEM

CROSS-REFERENCE TO RELATED APPLICATIONS

The present application is a national phase entry under 35 U.S.C. § 371 of International Application No. PCT/EP2019/062500, filed May 15, 2019, published in English, which claims priority to European Application No. 18173398.1 filed May 21, 2018, European Application No. 18173404.7 filed May 21, 2018, European Application No. 18173406.2 filed May 21, 2018, and European Application No. 18176708.8 filed Jun. 8, 2018, all of the disclosures of which are incorporated herein by reference.

TECHNICAL FIELD

The present disclosure relates generally to an aerosol generating article, and more particularly to an aerosol generating article for use with an aerosol generating device for heating the aerosol generating article to generate an aerosol for inhalation by a user. Embodiments of the present disclosure also relate to a method for manufacturing an aerosol generating article and to an aerosol generating system.

TECHNICAL BACKGROUND

Devices which heat, rather than burn, an aerosol forming material to produce an aerosol for inhalation have become popular with consumers in recent years.

Such devices can use one of a number of different approaches to provide heat to the aerosol forming material. One such approach is to provide an aerosol generating device which employs an induction heating system and into which an aerosol generating article, comprising aerosol forming material, can be removably inserted by a user. In such a device, an induction coil is provided with the device and an induction heatable susceptor is provided with the aerosol generating article. Electrical energy is provided to the induction coil when a user activates the device which in turn generates an alternating electromagnetic field. The susceptor couples with the electromagnetic field and generates heat which is transferred, for example by conduction, to the aerosol forming material and an aerosol is generated as the aerosol forming material is heated.

Embodiments of the present disclosure seek to provide an improved aerosol generating article.

SUMMARY OF THE DISCLOSURE

According to a first aspect of the present disclosure, there is provided an aerosol generating article comprising:

- a body of aerosol forming material;
- a tubular inductively heatable susceptor surrounding the body of aerosol forming material, the tubular susceptor comprising a rolled sheet having a longitudinally extending joint;
- a magnetic shielding material covering the joint; and
- a non-electrically conductive material between the magnetic shielding material and the joint.

The aerosol generating article is for use with an aerosol generating device for heating the aerosol forming material, without burning the aerosol forming material, to volatise at least one component of the aerosol forming material and thereby generate an aerosol for inhalation by a user of the aerosol generating device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms ‘aerosol’ and ‘vapour’ may be used interchangeably in this specification, particularly with regard to the form of the inhalable medium that is generated for inhalation by a user.

When the aerosol generating article is positioned in an aerosol generating device and exposed to a time varying electromagnetic field, heat is generated in the tubular inductively heatable susceptor due to eddy currents and magnetic hysteresis losses resulting in a conversion of energy from electromagnetic to heat. The heat generated in the tubular susceptor is transferred to the aerosol forming material, ensuring that it is uniformly heated to generate an aerosol with the desired characteristics.

When the inductively heatable tubular susceptor is exposed to a time varying electromagnetic field during use of the aerosol generating article, the edges of the rolled sheet that form the longitudinally extending joint of the tubular susceptor are charged with the same polarity (i.e. positive or negative). This generates a repulsive force between the edges of the rolled sheet and, consequently, the edges tend to repel each other causing them to separate at the longitudinally extending joint. This is undesirable because any separation between the edges of the rolled sheet will interrupt current flow in the tubular susceptor and increase the electrical resistance at the joint.

The provision of the magnetic shielding material and non-electrically conductive material addresses this problem because the magnetic shielding material is charged with an opposite polarity to that of the rolled sheet that forms the tubular susceptor. Thus, the edges of the rolled sheet are attracted towards the magnetic shielding material ensuring that they remain in proper electrical contact at the longitudinally extending joint, but are prevented from contacting the magnetic shielding material by the non-electrically conductive material that is positioned between the magnetic shielding material and the joint.

The longitudinally extending joint may extend between opposite edges of the rolled sheet.

The magnetic shielding material may extend along the longitudinally extending joint so that the joint is covered by the magnetic shielding material. The magnetic shielding material may comprise a magnetic shielding strip.

The tubular susceptor may comprise a wrapper formed of an inductively heatable susceptor material. For example, the tubular susceptor may comprise a metal wrapper, for example a metal foil. The inductively heatable susceptor material may comprise one or more, but not limited, of aluminium, iron, nickel, stainless steel and alloys thereof, e.g. Nickel Chromium or Nickel Copper.

The aerosol generating article may comprise a further body of aerosol forming material which may surround the tubular susceptor. The provision of a further body of aerosol forming material surrounding the tubular susceptor allows the characteristics of the aerosol generated during use of the article to be optimised.

The aerosol generating article may comprise a tubular member which may surround the further body of aerosol forming material. The tubular member may comprise a material which is substantially non-electrically conductive and non-magnetically permeable. The tubular member may comprise a wrapper and may, for example, comprise a paper wrapper. The wrapper may have longitudinally extending free edges, for example overlapping free edges, which are secured together using an adhesive which may also be substantially non-electrically conductive and non-magnetically permeable.

The tubular susceptor and the tubular member may be substantially concentric. The construction of the aerosol generating article is thereby simplified and uniform heating is achieved.

The aerosol generating article may be elongate and may be substantially cylindrical. The cylindrical shape of the aerosol generating article with its circular cross-section may advantageously facilitate insertion of the aerosol generating article into a cavity of an aerosol generating device which includes a helical induction coil defining the cavity.

The non-electrically conductive material may become electrically conductive when heated. By this, it is meant that the non-electrically conductive characteristics of the non-electrically conductive material may reduce when the non-electrically conductive material is heated and/or the non-electrically conductive material may completely lose its non-electrically conductive characteristics when heated. For example, the non-electrically conductive material may become electrically conductive when heated to a temperature between approximately 180° C. and 250° C. for a period between approximately 3 minutes and 10 minutes. With this arrangement, the effectiveness of the magnetic shielding material may be reduced when the non-electrically conductive material is heated resulting in failure of the longitudinally extending joint and preventing re-use of the aerosol generating article, thus avoiding the generation of undesirable flavour compounds from previously heated aerosol forming material within the aerosol generating article.

The amount and/or the density of the non-electrically conductive material may be selected to cause failure of the joint upon initiating a second use of the aerosol generating article. As noted above, preventing re-use of the aerosol generating article in this way can advantageously avoid the generation of undesirable flavour compounds from the previously heated aerosol forming material.

The non-electrically conductive material may be formed by part of the further body of aerosol forming material. This may simplify the manufacture of the aerosol generating article by avoiding the need to provide a separate component to act as the non-electrically conductive material, in particular because such a separate component (e.g. a non-electrically conductive adhesive) would need to withstand the high temperatures generated by the tubular inductively heatable susceptor and would need to be suitable for human consumption, e.g. if it releases one or more volatile compounds when heated. The use of a separate component might also interfere with aerosolisation of the aerosol forming material, and thus such an arrangement may optimise the amount of aerosol that is generated during use of the article.

The magnetic shielding material may be positioned in the further body of aerosol forming material so that part of the aerosol forming material of the further body is present between the magnetic shielding material and the tubular susceptor. The part of the aerosol forming material of the further body that is present between the magnetic shielding material and the tubular susceptor acts as the non-electrically conductive material between the magnetic shielding material and the longitudinally extending joint. The aerosol forming material, for example tobacco, may become carbonised when it is heated during use of the article and may, thus, become electrically conductive as discussed above thereby leading to failure of the longitudinally extending joint and preventing re-use of the aerosol generating article.

Part of the aerosol forming material of the further body may also be present between the magnetic shielding material and the tubular member. The magnetic shielding material may, thus, be securely held in a desired position by the further body of aerosol forming material.

The non-electrically conductive material may comprise a non-electrically conductive adhesive and the magnetic shielding material may be adhered to the non-electrically conductive adhesive. The non-electrically conductive adhesive may be adhered to the tubular susceptor along the joint. The use of a non-electrically conductive adhesive may provide a convenient way to secure the magnetic shielding material in the desired position and provide a convenient way to produce the aerosol generating article.

The magnetic shielding material and the tubular susceptor may comprise the same material, for example a metal such as aluminium. The use of the same material ensures that the charges induced in the magnetic shielding material and the tubular susceptor have opposite polarities. This ensures that the opposite magnetic fields generated in these two components are effectively cancelled.

The joint may have substantially the same value of electrical resistance as the value of electrical resistance of the tubular susceptor at all points surrounding the body of aerosol forming material. This arrangement ensures that the tubular susceptor is heated uniformly and minimises the likelihood of failure of the joint.

In some embodiments, the joint may be formed by an electrically conductive adhesive between opposite edges of the rolled sheet, by a mechanical connection between opposite edges of the rolled sheet or by welding together opposite edges of the rolled sheet. With such an arrangement, the likelihood of failure of the joint is further reduced. It should, however, be noted that failure of the joint may still occur upon initiating a second use of the article by appropriate selection of the amount and/or density of the non-electrically conductive material as discussed above, including in embodiments in which the opposite edges are secured by a mechanical connection or by welding.

The aerosol forming material may be any type of solid or semi-solid material. Example types of aerosol forming solids include granules, pellets, powder, shreds, strands, particles, gel, strips, loose leaves, cut filler, porous material, foam material or sheets.

The aerosol forming material may comprise plant derived material and in particular, the aerosol forming material may comprise tobacco.

The aerosol forming material may comprise an aerosol-former. Examples of aerosol-formers include polyhydric alcohols and mixtures thereof such as glycerine or propylene glycol. Typically, the aerosol forming material may comprise an aerosol-former content of between approximately 5% and approximately 50% on a dry weight basis. In some embodiments, the aerosol forming material may comprise an aerosol-former content of approximately 15% on a dry weight basis.

Upon heating, the aerosol forming material may release volatile compounds. The volatile compounds may include nicotine or flavour compounds such as tobacco flavouring.

According to a second aspect of the present disclosure, there is provided a method for manufacturing an aerosol generating article, the method comprising:

(i) applying an electrically conductive material along an edge of a sheet of inductively heatable susceptor material;

(ii) wrapping the sheet of inductively heatable susceptor material around a body of aerosol forming material to form a tubular inductively heatable susceptor having a longitudinally extending joint including the electrically conductive material;

(iii) providing a non-electrically conductive material along the joint;

(iv) providing a magnetic shielding material on the non-electrically conductive material;

(v) providing a further body of aerosol forming material around the tubular susceptor and the magnetic shielding material; and (vi) wrapping a sheet of material around the further body of aerosol forming material to form a tubular member surrounding the further body of aerosol forming material.

In one embodiment, the non-electrically conductive material may be formed by the further body of aerosol forming material. Steps (i) and (ii) may be performed before steps (iii) to (v) and step (vi) may be performed after steps (iii) to (v). Steps (iii) to (v) may be performed simultaneously. The advantages of the non-electrically conductive material being formed by part of the further body of aerosol forming material have already been set out above.

In another embodiment, the electrically conductive material may comprise an electrically conductive adhesive and the non-electrically conductive material may comprise a non-electrically conductive adhesive. Steps (i) and (iii) may be performed by providing a strip of the non-electrically conductive adhesive and a strip of the electrically conductive adhesive along opposite edges of the sheet of inductively heatable susceptor material on the same surface. Steps (i) and (iii) may alternatively be performed by providing a strip of the non-electrically conductive adhesive and a strip of the electrically conductive adhesive along the same edge of the sheet of inductively heatable susceptor material on opposite surfaces. Step (ii) may be performed after steps (i), (iii) and (iv), step (v) may be performed after step (ii) and step (vi) may be performed after step (v). Steps (iii) and (iv) may be performed simultaneously.

According to a third aspect of the present disclosure, there is provided an aerosol generating system comprising:

an aerosol generating device comprising a helical induction coil defining a cavity, the induction coil being configured to generate a time varying electromagnetic field; and an aerosol generating article as defined above positioned in the cavity so that a longitudinal axis of the tubular susceptor is substantially aligned with a longitudinal axis of the cavity.

By positioning the aerosol generating article in the cavity so that the longitudinal axis of the tubular susceptor is substantially aligned with the longitudinal axis of the cavity, the positional relationship between the tubular susceptor and the induction coil is optimised thereby providing for optimum coupling of the electromagnetic field with the tubular susceptor and, thus, optimum heating of the tubular susceptor during operation of the aerosol generating device.

The aerosol generating device may further comprise a controller adapted to:

provide a first operating phase upon initial activation of the device and a second operating phase after the first operating phase, the second operating phase having a longer duration than the first operating phase;

supply a first level of energy to the induction coil during the first operating phase and a second level of energy to the induction coil during the second operating phase, the second level of energy being lower than the first level of the energy;

wherein heating of the non-electrically conductive material during the first and second operating phases causes the non-electrically conductive material to become electrically conductive such that, during subsequent use of the system with the same aerosol generating article, failure of the joint occurs upon initiation of the first operating phase by the controller.

As explained above, it may be desirable to prevent re-use of the aerosol generating article to avoid the generation of undesirable flavour compounds from previously heated aerosol forming material within the same aerosol generating article. Supplying a higher level of energy to the induction coil during the first operating phase will promote failure of the joint upon initiating a subsequent use of the same aerosol generating article, thus interrupting the induction heating process and ensuring that the generation of undesirable flavour compounds from previously heated aerosol forming material within the same aerosol generating article is eliminated or at least minimised to the greatest possible extent.

DETAILED DESCRIPTION OF EMBODIMENTS

Embodiments of the present disclosure will now be described by way of example only and with reference to the accompanying drawings.

Figure 1:
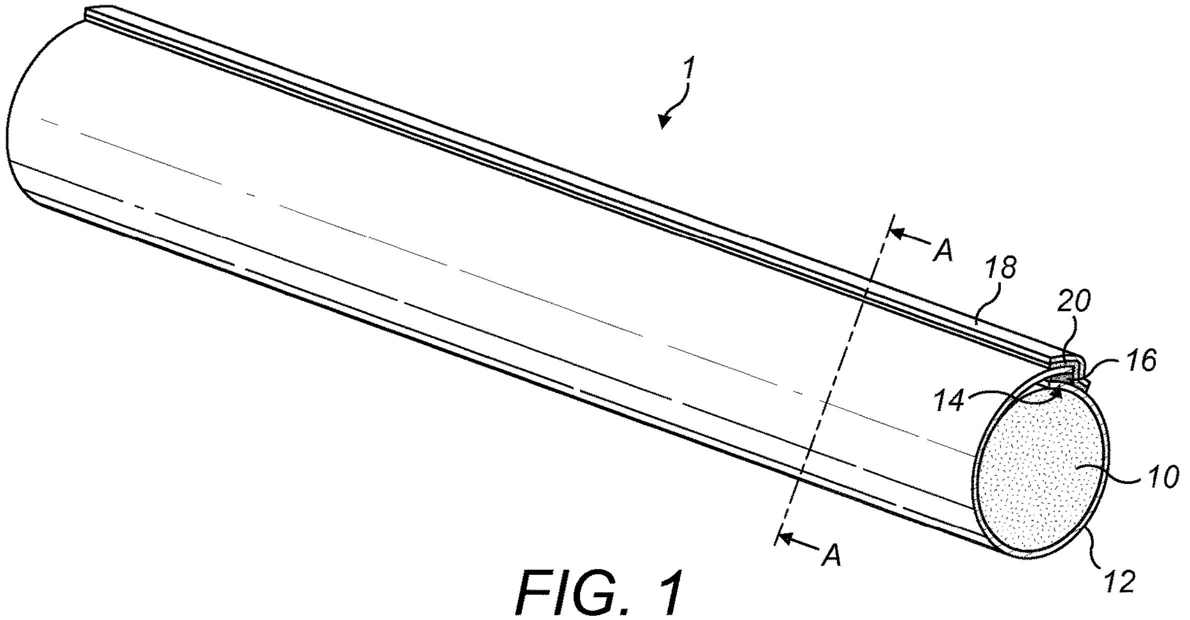
FIG. 1 is diagrammatic perspective view of a first example of an aerosol generating article.
Figure 2:
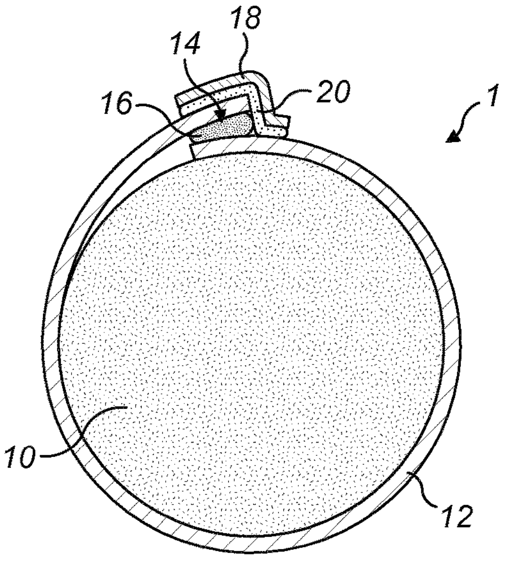
FIG. 2 is a diagrammatic cross-sectional view along the line A-A shown in FIG. 1.

Referring initially to FIGS. 1 and 2, there is shown a first example of an aerosol generating article 1 for use with an aerosol generating device, an example of which will be described later in this specification. The aerosol generating article 1 is elongate and substantially cylindrical. The circular cross-section facilitates handling of the article 1 by a user and insertion of the article 1 into a heating compartment of an aerosol generating device.

The article 1 comprises a body of aerosol forming material 10 and a tubular susceptor 12 surrounding the body of aerosol forming material 10. The tubular susceptor 12 is inductively heatable in the presence of a time varying electromagnetic field and comprises a metal wrapper formed of an inductively heatable susceptor material. The metal wrapper comprises a sheet of material, for example a metal foil, having longitudinally extending free edges and is rolled to form the tubular susceptor 12. The tubular susceptor 12 has a longitudinally extending joint 14 between the opposite free edges of the sheet. In the illustrated example, the edges are arranged to overlap each other and are secured together by an electrically conductive adhesive 16. The electrically conductive adhesive 16 typically comprises one or more adhesive components interspersed with one or more electrically conductive components. The metal wrapper and the electrically conductive adhesive 16 together form a closed electrical circuit which surrounds the first body of aerosol forming material 10. In other examples, the edges of the sheet can be arranged to overlap and contact each other without the electrically conductive adhesive 16 being present.

The aerosol generating article 1 includes magnetic shielding material in the form of a magnetic shielding strip 18 which extends along the longitudinally extending joint 14 as best seen in FIG. 1 so that the joint 14 is covered by the magnetic shielding strip 18. A non-electrically conductive material 20 in the form of a strip of non-electrically conductive adhesive is provided between the magnetic shielding strip 18 and the joint 14 and secures the magnetic shielding strip 18 in position along the joint 14.

When a time varying electromagnetic field is applied in the vicinity of the metal wrapper during use of the article 1 in an aerosol generating device, heat is generated in the metal wrapper due to eddy currents and magnetic hysteresis losses and the heat is transferred from the metal wrapper to the adjacent body of aerosol forming material 10 to heat the aerosol forming material without burning it and to thereby generate an aerosol for inhalation by a user. The metal wrapper constituting the tubular susceptor 12 is in contact over substantially its entire inner surface with the body of aerosol forming material 10, thus enabling heat to be transferred directly, and therefore efficiently, from the metal wrapper to the aerosol forming material 10.

Although in the illustrated example the edges of the metal wrapper are secured together by the electrically conductive adhesive 16, during use of the article 1 in an aerosol generating device when the tubular susceptor 12 is exposed to a time varying electromagnetic field, the edges of the wrapper that form the tubular susceptor 12 tend to repel each other because, as explained earlier in this specification, they are charged with the same polarity. In accordance with the present disclosure, the repulsive force is cancelled by the magnetic shielding strip 18 which is charged with an opposite polarity to that of the metal wrapper. Thus, the edges of the metal wrapper are attracted towards the magnetic shielding strip 18 ensuring that they remain in proper electrical contact with each other at the longitudinally extending joint 14. The edges of the metal wrapper are prevented from making electrical contact with the magnetic shielding strip 18 by the non-electrically conductive material 20. It will be understood that this arrangement minimises the likelihood of failure of the joint 14 during use of the article 1.

Figure 3:
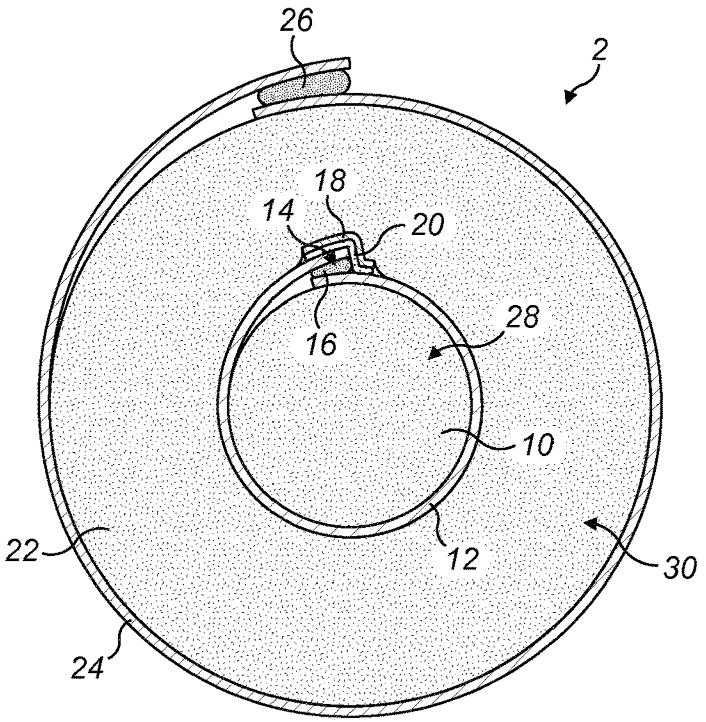
FIG. 3 is a diagrammatic cross-sectional view of a second example of an aerosol generating article.

Referring now to FIG. 3, there is shown a diagrammatic cross-sectional view of a second example of an aerosol generating article 2 which is similar to the aerosol generating article 1 illustrated in FIGS. 1 and 2 and in which corresponding elements are designated using the same reference numerals.

The aerosol generating article 2 comprises a further body of aerosol forming material 22 surrounding the tubular susceptor 12 and a tubular member 24 surrounding the further body of aerosol forming material 22.

The tubular member 24 is concentric with the tubular susceptor 12 and comprises a paper wrapper. Although a paper wrapper may be preferred, the tubular member 24 can comprise any material which is substantially non-electrically conductive and non-magnetically permeable so that the tubular member 24 is not inductively heated in the presence of a time varying electromagnetic field during use of the article 2 in an aerosol generating device. The paper wrapper constituting the tubular member 24 also comprises a sheet of material having longitudinally extending free edges which are arranged to overlap each other. The free edges are secured together by an adhesive 26 which is substantially non-electrically conductive and non-magnetically permeable so that it is not inductively heated during use of the article 2 in an aerosol generating device.

The tubular susceptor 12 defines an inner cavity 28 in which the body of aerosol forming material 10 is positioned and the tubular susceptor 12 and the tubular member 24 define therebetween an annular cavity 30 in which the further body of aerosol forming material 22 is positioned. The bodies of aerosol forming material 10, 22, the tubular susceptor 12 and the tubular member 24 all have the same axial length and are arranged so that their respective ends are axially aligned. The body of aerosol forming material 10 substantially fills the inner cavity 28 and the further body of aerosol forming material 22 substantially fills the annular cavity 30.

The aerosol forming material of the body 10 and further body 22 is typically a solid or semi-solid material. Examples of suitable aerosol forming solids include powder, shreds, strands, porous material, foam material and sheets. The aerosol forming material typically comprises plant derived material and, in particular, comprises tobacco.

The aerosol forming material of the body 10 and further body 22 comprises an aerosol-former such as glycerine or propylene glycol. Typically, the aerosol forming material may comprise an aerosol-former content of between approximately 5% and approximately 50% on a dry weight basis. Upon heating due to heat transfer from the tubular susceptor 12, the aerosol forming material of both the body 10 and further body 22 releases volatile compounds possibly including nicotine or flavour compounds such as tobacco flavouring.

Figure 4:
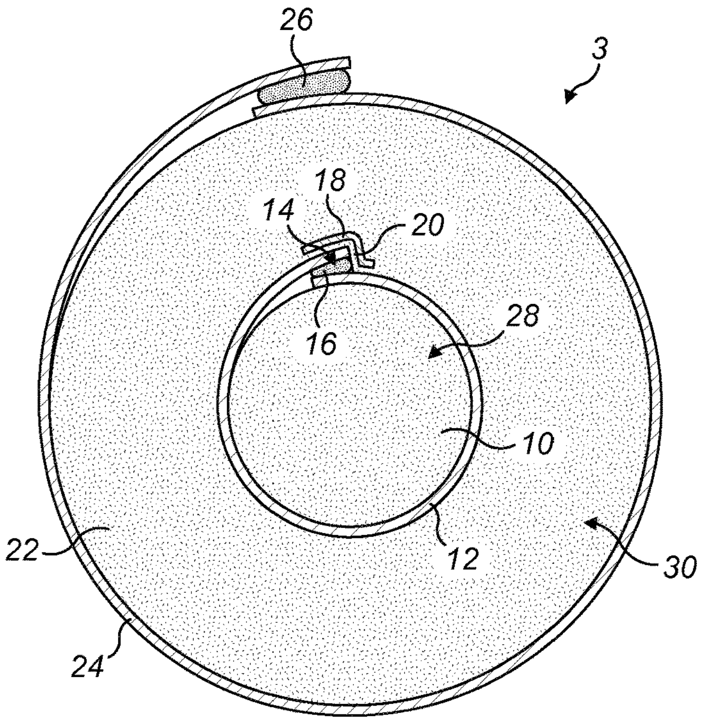
FIG. 4 is a diagrammatic cross-sectional view of a third example of an aerosol generating article similar to the second example shown in FIG. 3.

Referring now to FIG. 4, there is shown a diagrammatic cross-sectional view of a third example of an aerosol generating article 3 which is similar to the aerosol generating article 2 illustrated in FIG. 3 and in which corresponding elements are designated using the same reference numerals.

In the aerosol generating article 3, the non-electrically conductive material 20 is formed by part of the further body of aerosol forming material 22. This is achieved by positioning the magnetic shielding strip 18 in the further body of aerosol forming material 22 so that part of the aerosol forming material of the further body 22 is present between the magnetic shielding strip 18 and the tubular susceptor 12 and so that part of the aerosol forming material of the further body 22 is present between the magnetic shielding strip 18 and the tubular member 24.

The aerosol generating article 3 is particularly suitable for use with an aerosol generating device comprising a controller which is adapted to provide a first operating phase upon initial activation of the device and a second operating phase after the first operating phase, as will be described in further detail later in this specification.

Figure 5:
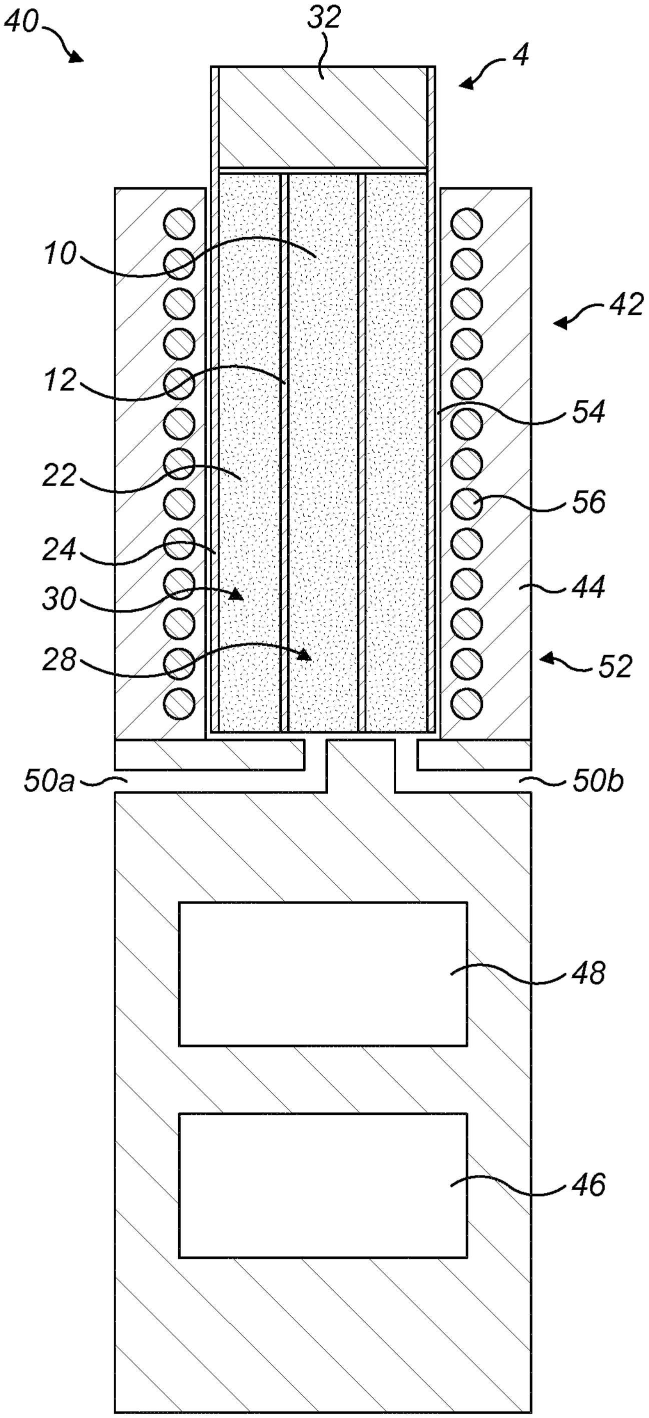
FIG. 5 is a diagrammatic cross-sectional view of an aerosol generating system comprising an aerosol generating device and a fourth example of an aerosol generating article similar to the second example illustrated in FIG. 3.

Referring now to FIG. 5, there is shown an aerosol generating system 40 for generating an aerosol to be inhaled. The aerosol generating system 40 comprises an aerosol generating device 42 having a housing 44, a power source 46 and a controller 48 which may be configured to operate at high frequency. The power source 46 typically comprises one or more batteries which could, for example, be inductively rechargeable. The aerosol generating device 42 also includes first and second air inlets 50*a*, 50*b*.

The aerosol generating device 42 comprises an induction heating assembly 52 for heating an aerosol forming material. The induction heating assembly 52 comprises a generally cylindrical heating compartment 54 which is arranged to receive a correspondingly shaped generally cylindrical aerosol generating article in accordance with aspects of the present disclosure.

FIG. 5 shows a fourth example of an aerosol generating article 4 positioned in the heating compartment 54. The aerosol generating article 4 is similar to the aerosol generating article 3 illustrated in FIG. 4 and additionally includes an air-permeable plug 32, for example comprising cellulose acetate fibres, at an axial end thereof. In this example, the axial dimension of the tubular member 24 is larger than the axial dimension of the tubular susceptor 12 to define a cavity in which the air-permeable plug 32 is positioned.

The heating compartment 54 and the aerosol generating article 4 are arranged so that the air-permeable plug 32 projects from the heating compartment 54 thus enabling a user to engage their lips with the projecting part of the article 4 to inhale aerosol generated during operation of the system 40 through the air-permeable plug 32.

The air inlets 50*a*, 50*b* are both in communication with the heating compartment 54. It will be noted that the air inlet 50*a* is arranged to direct air through the body of aerosol forming material 10 and that the air inlet 50*b* is arranged to direct air through the further body of aerosol forming material 22. It will be understood by one of ordinary skill in the art that other arrangements are entirely within the scope of the present disclosure.

The induction heating assembly 52 comprises a helical induction coil 56, having first and second axial ends, which extends around the cylindrical heating compartment 54 and which can be energised by the power source 46 and controller 48. Thus, the induction coil 56 defines a cavity, in the form of heating compartment 54, in which the aerosol generating article 4 is positioned. It will be noted that the heating compartment 54 and the aerosol generating article 4 each have a respective longitudinal axis and that the longitudinal axes are substantially aligned with each other when the aerosol generating article 4 is positioned inside the heating compartment 54.

The controller 48 includes, amongst other electronic components, an inverter which is arranged to convert a direct current from the power source 46 into an alternating high-frequency current for the induction coil 56. As will be understood by one of ordinary skill in the art, when the induction coil 56 is energised by the alternating high-frequency current, an alternating and time-varying electromagnetic field is produced. This couples with the metal wrapper constituting the tubular susceptor 12 and generates eddy currents and/or magnetic hysteresis losses in the metal wrapper causing it to heat up. The heat is then transferred from the metal wrapper to the aerosol forming material of the body 10 and further body 22, for example by conduction, radiation and convection.

In the example of FIG. 5, the metal wrapper constituting the tubular susceptor 12 is in direct contact with the aerosol forming material of the body 10 and further body 22, such that when the metal wrapper is inductively heated by the induction coil 56 of the induction heating assembly 52, heat is transferred from the metal wrapper to the aerosol forming material, to heat the aerosol forming material and produce an aerosol. The aerosolisation of the aerosol forming material is facilitated by the addition of air from the surrounding environment through the air inlets 50*a*, 50*b*. The aerosol generated by heating the aerosol forming material of the body 10 and further body 22 then exits the inner and annular cavities 28, 30 of the article 4 through the air-permeable plug 32 and may, for example, be inhaled by a user of the system 40.

In some embodiments, the controller 48 is adapted to provide a first operating phase upon initial activation of the aerosol generating device 42 followed by a second operating phase which has a longer duration than the first operating phase. The controller 48 is adapted to supply a first level of energy to the induction coil 56 during the first operating phase and a second level of energy to the induction coil 56 during the second operating phase which is lower than the first level of energy.

When the aerosol generating article 4 is inserted into the heating compartment 54, the aerosol generating material of the body 10 and the further body 22 is heated in the manner described above by heat transferred from the metal wrapper constituting the tubular susceptor 12 during both the first and second operating phases. In some embodiments, the aerosol forming material may be selected so that it loses its non-electrically conductive characteristics as it is heated during both the first and second operating phases, in other words so that it becomes electrically conductive. For example, if the aerosol forming material comprises tobacco, the tobacco may become carbonised due to heating during the first and second operating phases of the aerosol generating device 42.

With this arrangement, the amount and/or density of the part of the further body of aerosol forming material 22 that is positioned between the magnetic shielding strip 18 and the tubular susceptor 12 to act as the non-electrically conductive material 20 may be selected so that if any attempt is made to re-use the aerosol generating article 4 for a second time, failure of the joint 14 will occur upon initiation of the first operating phase when the aerosol generating device 42 is activated by a user due to the higher energy input that occurs during the first operating phase. It will be understood by one of ordinary skill in the art that failure of the joint 14 will occur not only in embodiments in which the overlapping edges of the tubular susceptor 12 are secured together by an electrically conductive adhesive 16, but also in embodiments in which the edges overlap without the electrically conductive adhesive 16 being present and in which the overlapping edges are secured together by a mechanical connection or by welding. Preventing re-use of the aerosol generating article 4 in this way advantageously helps to avoid the generation of undesirable flavour compounds, which can lead to an off-taste, by preventing re-heating of previously heated aerosol forming material within the same aerosol generating article 4.

Figure 6:
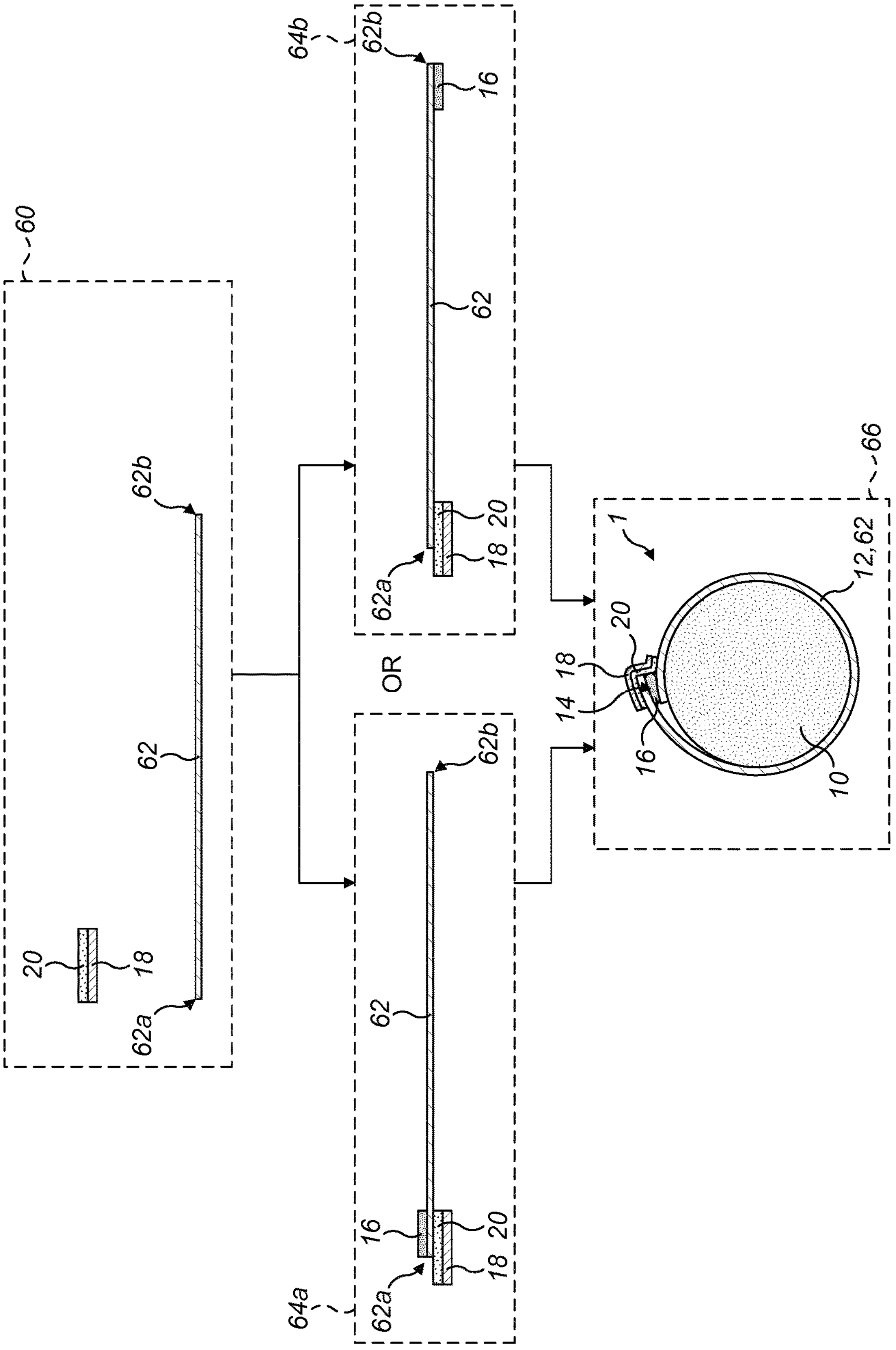
FIG. 6 is a diagrammatic illustration of a method for manufacturing the first example of the aerosol generating article illustrated in FIGS. 1 and 2.

Referring now to FIG. 6, there is shown an example of a method for manufacturing the aerosol generating article 1 illustrated in FIGS. 1 and 2.

In a first step 60, the method comprises providing a sheet 62 of electrically conductive susceptor material, for example a metal foil, having longitudinally extending free edges 62*a*, 62*b* and applying a non-electrically conductive material 20 in the form of a non-electrically conductive adhesive to a magnetic shielding strip 18.

In a first example of a second step 64*a*, a strip of electrically conductive adhesive 16 is applied to a surface of the sheet 62 at one of the free edges 62*a* and the non-electrically conductive adhesive 20 is applied to the opposite surface of the sheet 62 along the same edge 62*a* to position the magnetic shielding strip 18 along the edge 62*a*.

In a second example of a second step 64*b*, a strip of electrically conductive adhesive 16 is applied to a surface of the sheet 62 at one of the free edges 62*b* and the non-electrically conductive adhesive 20 is applied to the same surface of the sheet 62 along the opposite edge 62*a* to position the magnetic shielding strip 18 along the edge 62*a*.

In a third step 66, the sheet 62 is wrapped around a body of aerosol forming material 10 so that the free edges 62*a*, 62*b* of the sheet 62 overlap and are secured to each other by the electrically conductive adhesive 16 and so that the magnetic shielding strip 18 is secured along the longitudinally extending joint 14 by the non-electrically conducive adhesive 20 which is positioned between the magnetic shielding strip 18 and the joint 14.

Figure 7:
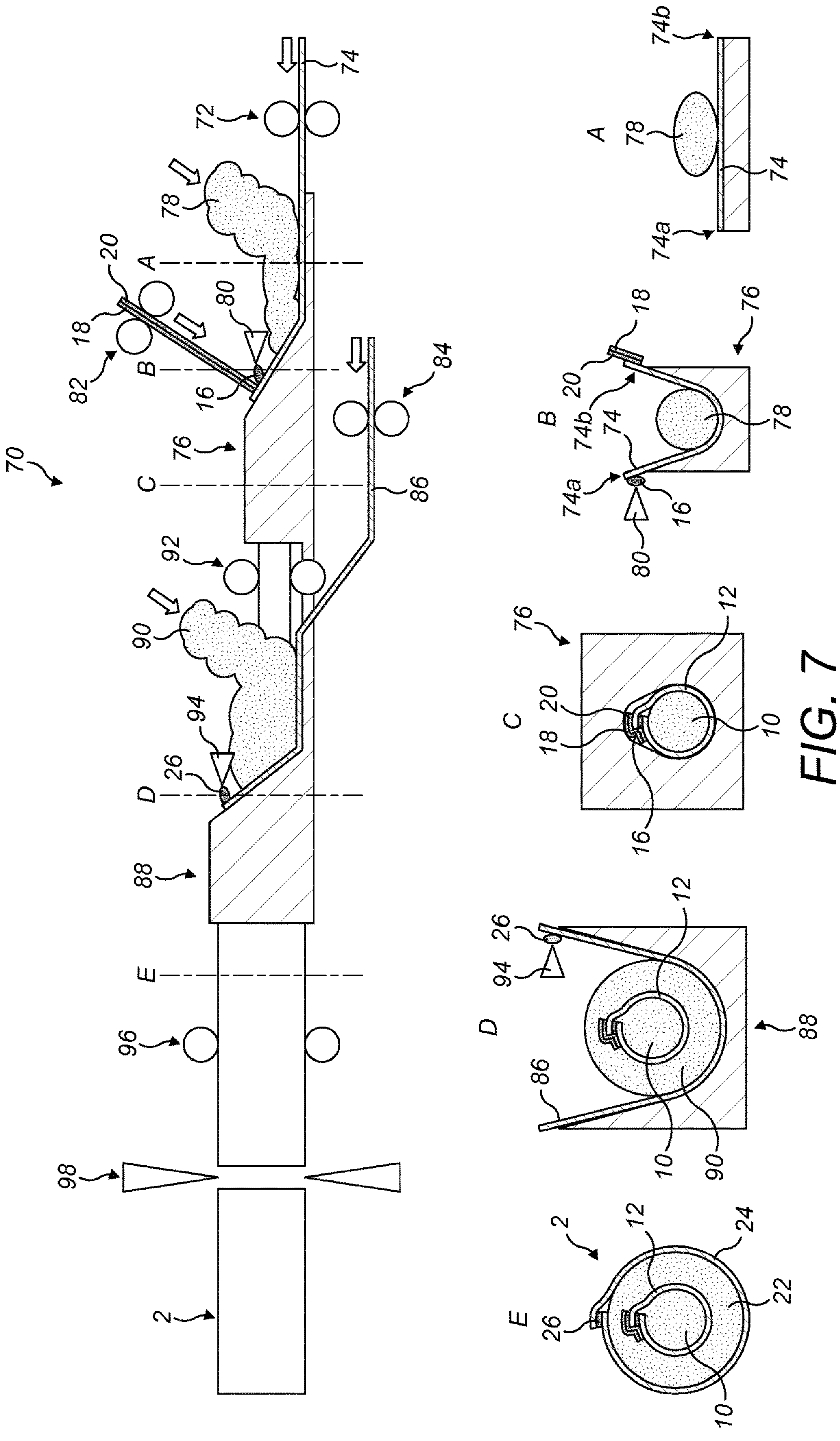
FIG. 7 is a diagrammatic illustration of an apparatus and method for manufacturing the second example of the aerosol generating article illustrated in FIG. 3.

Referring now to FIG. 7, there is shown an example of an apparatus 70 and method for manufacturing the aerosol generating article 2 illustrated in FIG. 3.

The apparatus 70 comprises feed rollers 72 which operate to transport a continuous web or sheet 74 of electrically conductive susceptor material, for example a metal foil, having longitudinally extending free edges 74*a*, 74*b* to a first wrapping station 76. Aerosol forming material 78 is deposited on an upper surface the sheet 74 at position A as it is transported by the feed rollers 72 to the first wrapping station 76.

The apparatus 70 includes an applicator 80, for example a nozzle, which applies an electrically conductive adhesive 16 to a surface of the sheet 74 along one of its edges 74*a* at position B as the sheet 74 is transported to the first wrapping station 76 by the feed rollers 72. The apparatus 70 also includes feed rollers 82 which supply a magnetic shielding strip 18 and non-electrically conductive adhesive 20 for application to the same surface of the sheet 74 as the electrically conductive adhesive 16 along an opposite edge 74*b* of the sheet 74. The magnetic shielding strip 18 is secured along the edge 74*b* at position B by part of the non-electrically conductive adhesive 20 whilst part of the non-electrically conductive adhesive 20 remains exposed.

As the sheet 74 is transported and guided through the first wrapping station 76, it is wrapped around the aerosol forming material 78 so that it forms a continuous rod comprising a tubular susceptor 12 which surrounds a first body of aerosol forming material 10 as shown at position C and so that the magnetic shielding strip 18 is secured by the non-electrically conductive adhesive 20 to extend along a longitudinally extending joint 14 between the edges 74*a*, 74*b*.

After exiting the first wrapping station 76, the continuous rod is transported to a second wrapping station 88 by transport rollers 92. At the same time, feed rollers 84 operate to transport a continuous web or sheet 86 of non-electrically conductive material, for example a paper wrapper, to the second wrapping station 88 and aerosol forming material 90 is deposited on an upper surface the sheet 86 as it is transported by the feed rollers 84 to the second wrapping station 88.

The apparatus 70 includes an applicator 94, for example a nozzle, which applies a non-electrically conductive adhesive 26 to a surface of the sheet 86 along one of its edges at position D as the sheet 86 is transported through the second wrapping station 88 by the feed rollers 84.

As the sheet 86 is transported and guided through the second wrapping station 88, it is wrapped around the aerosol forming material 90 to form a further body of aerosol forming material 22 surrounding the tubular susceptor 12 and a tubular member 24 in the form of a paper wrapper which surrounds the further body of aerosol forming material 22. The opposite edges of the tubular member 24 formed by the wrapped sheet 86 are secured together by the non-electrically conductive adhesive 26 applied to the sheet 86 by the applicator 94.

The continuous rod shown at position E is transported by transport rollers 96 to a cutting station 98 where it is cut at appropriate positions into predetermined lengths to form multiple aerosol generating articles 2. It will be understood that this type of method is suitable for the mass production of aerosol generating articles 2.

Figure 8:
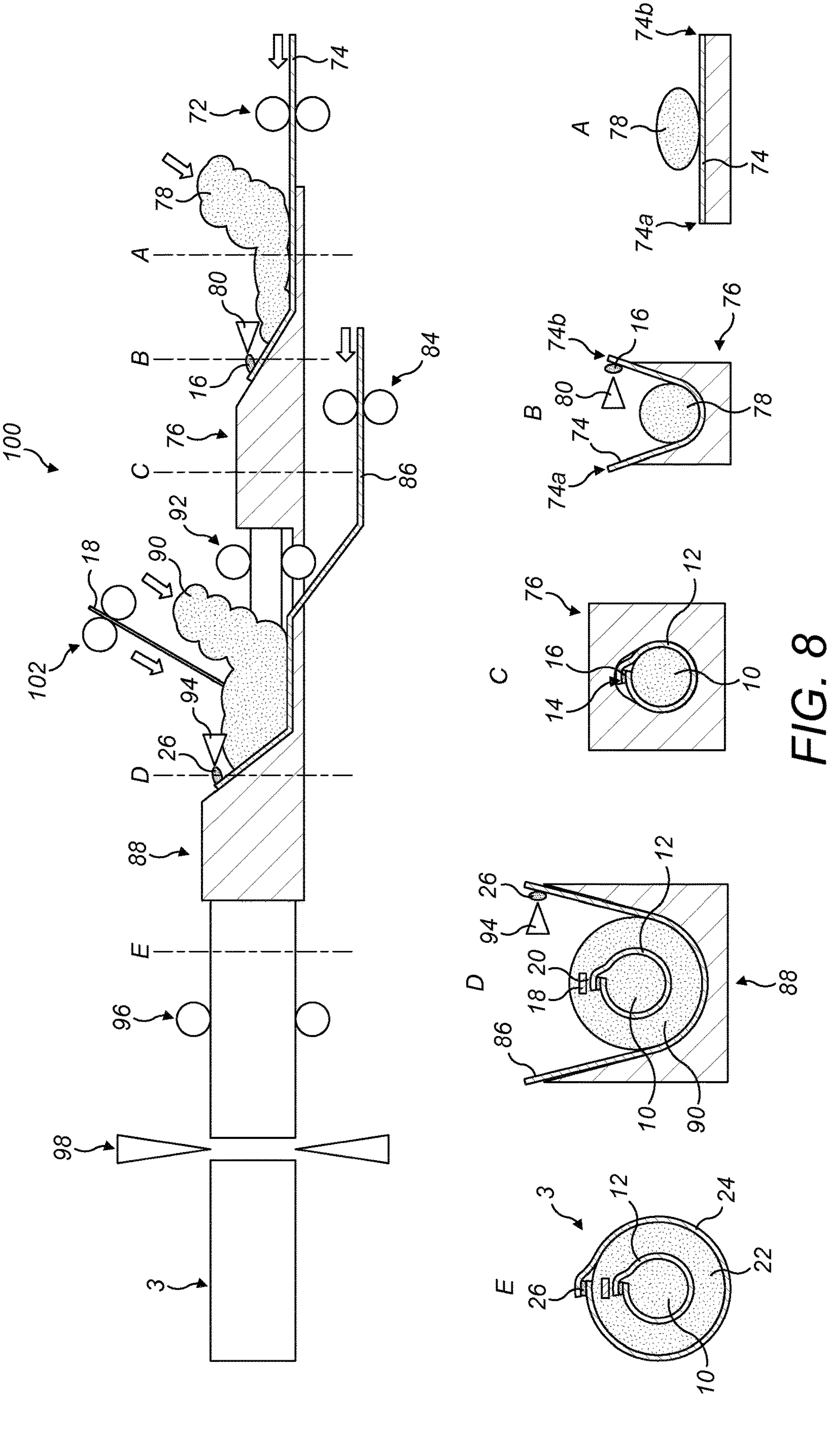
FIG. 8 is a diagrammatic illustration of an apparatus and method for manufacturing the third example of the aerosol generating article illustrated in FIG. 4.

Referring now to FIG. 8, there is shown an example of an apparatus 100 and method for manufacturing the aerosol generating article 3 illustrated in FIG. 4. The apparatus 100 and method are similar to the apparatus 70 and method described above with reference to FIG. 7 and corresponding elements are, therefore, designated using the same reference numerals.

The apparatus 100 comprises feed rollers 72 which operate to transport a continuous web or sheet 74 of electrically conductive susceptor material, for example a metal foil, having longitudinally extending free edges 74*a*, 74*b* to a first wrapping station 76. Aerosol forming material 78 is deposited on an upper surface the sheet 74 at position A as it is transported by the feed rollers 72 to the first wrapping station 76.

The apparatus 100 includes an applicator 80, for example a nozzle, which applies an electrically conductive adhesive 16 to a surface of the sheet 74 along one of its edges 74*b* at position B as the sheet 74 is transported to the first wrapping station 76 by the feed rollers 72.

As the sheet 74 is transported and guided through the first wrapping station 76, it is wrapped around the aerosol forming material 78 so that it forms a continuous rod comprising a tubular susceptor 12 which surrounds a first body of aerosol forming material 10 as shown at position C and which has a longitudinally extending joint 14 between its edges 74*a*, 74*b*.

After exiting the first wrapping station 76, the continuous rod is transported to a second wrapping station 88 by transport rollers 92. At the same time, feed rollers 84 operate to transport a continuous web or sheet 86 of non-electrically conductive material, for example a paper wrapper, to the second wrapping station 88 and aerosol forming material 90 is deposited on an upper surface the sheet 86 as it is transported by the feed rollers 84 to the second wrapping station 88.

The apparatus 100 includes an applicator 94, for example a nozzle, which applies a non-electrically conductive adhesive 26 to a surface of the sheet 86 along one of its edges at position D as the sheet 86 is transported through the second wrapping station 88 by the feed rollers 84.

The apparatus 100 includes feed rollers 102 which position a magnetic shielding strip 18 in the aerosol forming material 90. The positioning of the magnetic shielding strip 18 is preferably carefully controlled to ensure that a predetermined amount and/or density of the aerosol forming material 90 is positioned between the magnetic shielding strip 18 and the tubular susceptor 12. The aerosol forming material 90 positioned between the magnetic shielding strip 18 and the tubular susceptor 12 acts as a non-electrically conductive material 20.

As the sheet 86 is transported and guided through the second wrapping station 88, it is wrapped around the aerosol forming material 90 to form a further body of aerosol forming material 22 surrounding the tubular susceptor 12 and a tubular member 24 in the form of a paper wrapper which surrounds the further body of aerosol forming material 22. The opposite edges of the tubular member 24 formed by the wrapped sheet 86 are secured together by the non-electrically conductive adhesive 26 applied to the sheet 86 by the applicator 94.

The continuous rod shown at position E is transported by transport rollers 96 to a cutting station 98 where it is cut at appropriate positions into predetermined lengths to form multiple aerosol generating articles 3. It will be understood that this type of method is suitable for the mass production of aerosol generating articles 3.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An aerosol generating article comprising:

a body of aerosol forming material;

a tubular inductively heatable susceptor surrounding the body of aerosol forming material, the tubular susceptor comprising a rolled sheet having a longitudinally extending joint;

a magnetic shielding material covering the joint; and a non-electrically conductive material between the magnetic shielding material and the joint.

2. The aerosol generating article according to claim 1, wherein the article comprises a further body of aerosol forming material surrounding the tubular susceptor and a tubular member surrounding the further body of aerosol forming material.

3. The aerosol generating article according to claim 2, wherein the non-electrically conductive material is formed by part of the further body of aerosol forming material.

4. The aerosol generating article according to claim 2, wherein the magnetic shielding material is positioned in the further body of aerosol forming material so that part of the aerosol forming material of the further body is present between the magnetic shielding material and the tubular susceptor.

5. The aerosol generating article according to claim 2, wherein the magnetic shielding material is positioned in the further body of aerosol forming material so that part of the aerosol forming material of the further body is present between the magnetic shielding material and the tubular susceptor, and so that part of the aerosol forming material of the further body is present between the magnetic shielding material and the tubular member.

6. The aerosol generating article according to claim 1, wherein the non-electrically conductive material becomes electrically conductive when heated.

7. The aerosol generating article according to claim 1, wherein the amount and density of the non-electrically conductive material are selected to cause failure of the joint upon initiating a second use of the aerosol generating article.

8. The aerosol generating article according to claim 1, wherein the non-electrically conductive material comprises a non-electrically conductive adhesive and the magnetic shielding material is adhered to the non-electrically conductive adhesive.

9. The aerosol generating article according to claim 8, wherein the non-electrically conductive adhesive is adhered to the tubular susceptor along the joint.

10. The aerosol generating article according to claim 1, wherein the magnetic shielding material and the tubular susceptor comprise the same material.

11. The aerosol generating article according to claim 1, wherein the joint has substantially the same value of electrical resistance as the value of electrical resistance of the tubular susceptor at all points surrounding the body of aerosol forming material.

12. The aerosol generating article according to claim 1, wherein the joint is formed by an electrically conductive adhesive between opposite edges of the rolled sheet, by a mechanical connection between opposite edges of the rolled sheet or by welding together opposite edges of the rolled sheet.

13. A method for manufacturing an aerosol generating article, the method comprising:

(i) applying an electrically conductive material along an edge of a sheet of inductively heatable susceptor material;

(ii) wrapping the sheet of inductively heatable susceptor material around a body of aerosol forming material to form a tubular inductively heatable susceptor having a longitudinally extending joint including the electrically conductive material;

(iii) providing a non-electrically conductive material;

(iv) providing a magnetic shielding material on the non-electrically conductive material;

(v) providing a further body of aerosol forming material around the tubular susceptor and the magnetic shielding material; and (vi) wrapping a sheet of material around the further body of aerosol forming material to form a tubular member surrounding the further body of aerosol forming material.

14. The method according to claim 13, wherein the non-electrically conductive material is formed by the further body of aerosol forming material, and wherein steps (i) and (ii) are performed before steps (iii) to (v) and step (vi) is performed after steps (iii) to (v).

15. The method according to claim 14, wherein steps (iii) to (v) are performed simultaneously.

16. The method according to claim 13, wherein the electrically conductive material comprises an electrically conductive adhesive and the non-electrically conductive material comprises a non-electrically conductive adhesive, and wherein:

steps (i) and (iii) are performed by providing a strip of the non-electrically conductive adhesive and a strip of the electrically conductive adhesive along opposite edges of the sheet of inductively heatable susceptor material on the same surface or by providing a strip of the non-electrically conductive adhesive and a strip of the electrically conductive adhesive along the same edge of the sheet of inductively heatable susceptor material on opposite surfaces;

wherein step (ii) is performed after steps (i), (iii) and (iv), step (v) is performed after step (ii) and step (vi) is performed after step (v).

17. The method according to claim 16, wherein steps (iii) and (iv) are performed simultaneously.

18. An aerosol generating system comprising:

an aerosol generating device comprising a helical induction coil defining a cavity, the induction coil being configured to generate a time varying electromagnetic field; and the aerosol generating article according to claim 6 positioned in the cavity so that a longitudinal axis of the tubular susceptor is substantially aligned with a longitudinal axis of the cavity.

19. The aerosol generating system according to claim 18, the aerosol generating device further comprising a controller adapted to:

provide a first operating phase upon initial activation of the device and a second operating phase after the first operating phase, the second operating phase having a longer duration than the first operating phase;

supply a first level of energy to the induction coil during the first operating phase and a second level of energy to the induction coil during the second operating phase, the second level of energy being lower than the first level of the energy;

wherein heating of the non-electrically conductive material during the first and second operating phases causes the non-electrically conductive material to become electrically conductive such that, during subsequent use of the system with the same aerosol generating article, failure of the joint occurs upon initiation of the first operating phase by the controller.

* * * * *